US009952428B2

(12) United States Patent
Dominici et al.

(10) Patent No.: US 9,952,428 B2
(45) Date of Patent: Apr. 24, 2018

(54) HEADS-UP DISPLAY COMPRISING AN OPTICAL MIXER WITH CONTROLLABLE PUPIL EXPANSION

(71) Applicant: THALES, Courbevoie (FR)

(72) Inventors: Johanna Dominici, Le Haillan (FR); Sebastien Ellero, Andiran (FR); Philippe Augereau, Cestas (FR)

(73) Assignee: Thales, Courbevoie (FR)

( * ) Notice: Subject to any disclaimer, the term of this patent is extended or adjusted under 35 U.S.C. 154(b) by 342 days.

(21) Appl. No.: 14/708,152

(22) Filed: May 8, 2015

(65) Prior Publication Data
US 2015/0323790 A1 Nov. 12, 2015

(30) Foreign Application Priority Data

May 9, 2014 (FR) ...................................... 14 01047

(51) Int. Cl.
G02B 27/01 (2006.01)
G02B 27/14 (2006.01)
G02B 27/00 (2006.01)

(52) U.S. Cl.
CPC ..... *G02B 27/0101* (2013.01); *G02B 27/0093* (2013.01); *G02B 27/0172* (2013.01); *G02B 27/145* (2013.01); *G02B 2027/0187* (2013.01)

(58) Field of Classification Search
CPC ............ G02B 27/0101; G02B 27/0093; G02B 27/145; G02B 27/0172; G02B 2027/0187
See application file for complete search history.

(56) References Cited

U.S. PATENT DOCUMENTS 5,483,307 A * 1/1996 Anderson .......... G02B 26/0833
353/28
6,545,650 B1 * 4/2003 Yamada ............. G02B 27/0093
345/7

(Continued)

FOREIGN PATENT DOCUMENTS

WO  WO 2006/064301 A1  6/2006
WO  WO 2013/164665 A1  11/2013
WO  WO2013164665 * 11/2013 ............. G02B 27/42

OTHER PUBLICATIONS

French Search Report for French Counterpart Application No. FR 1401047, 8 pgs. (dated Jan. 22, 2015).

*Primary Examiner* — Benyam Ketema
(74) *Attorney, Agent, or Firm* — Womble Bond Dickinson (US) LLP

(57) ABSTRACT

The general field of the invention is that of heads-up display systems comprising at least one display and one optical guide comprising a first image guide comprising a plurality of first internal semi-reflecting plates, inclined with respect to a first plane. The heads-up display system according to the invention comprises:
an oculometer designed to detect the position of the pupil of the eye of an observer;
at least one of the said first plates comprising a processing with programmable reflectivity, the said reflectivity depending on the position and/or of the orientation of the ocular pupil detected by the oculometer, in such a manner as to reflect the image of the display towards the said pupa and only towards the latter.
The display system can comprise a second image guide perpendicular to the first.

8 Claims, 3 Drawing Sheets

(56) References Cited

U.S. PATENT DOCUMENTS

| | | | | |
|---|---|---|---|---|
| 2002/0044152 A1* | 4/2002 | Abbott, III | G06T 11/00 | 345/629 |
| 2011/0013245 A1* | 1/2011 | Tanaka | G02B 26/105 | 359/201.2 |
| 2013/0207887 A1* | 8/2013 | Raffle | G02B 27/00 | 345/156 |
| 2013/0250431 A1* | 9/2013 | Robbins | G02B 27/0172 | 359/633 |
| 2014/0160014 A1* | 6/2014 | Dominici | G02B 27/01 | 345/156 |
| 2014/0160577 A1* | 6/2014 | Dominici | G02B 27/0081 | 359/633 |
| 2014/0232651 A1* | 8/2014 | Kress | G02B 27/0172 | 345/158 |
| 2015/0138248 A1* | 5/2015 | Schrader | G02B 27/017 | 345/690 |
| 2015/0160577 A1* | 6/2015 | Yamada | G03G 9/135 | 430/114 |

* cited by examiner

HEADS-UP DISPLAY COMPRISING AN OPTICAL MIXER WITH CONTROLLABLE PUPIL EXPANSION

BACKGROUND OF THE INVENTION

1. Field of the Invention

The field of the invention is that of heads-up display systems comprising an optical guide used for the transport of a collimated image coming from a micro-display. These optical guides or optical mixers allow this collimated image to be superposed onto the external scene. The applications relate both to the consumer field and to the aeronautical field.

2. Description of the Prior Art

A display system comprising such a guide comprises an imaging system with small dimensions, collimation optics and the optical guide. The function of the optical guide is to bring the collimated image to the eye of the user while creating a minimum of visual interference and while being as discrete and as small as possible. In its basic version, it comprises a thin plate into which is inserted a semi-reflecting plate. This plate has a low or zero optical power and only contributes a very low interference to the vision of the outside. Generally speaking, this plate is a plate with plane and parallel faces but other shapes may be envisaged. Thus, the Patent application PCT WO 2008/084301 entitled "System and method for beam expansion with near focus in a display device" describes a curved optical guide used for the propagation and the transmission of images.

The light beams coming from the display propagate by total internal reflection within the optical guide, are reflected on the semi-reflecting plate and exit from the optical guide towards the eye of the user.

If the optical guide only comprises a single semi-reflecting plate, the observer can only see a thin portion of the image, the pupil of the system being situated far from the eye and being, by nature, very small. In order to overcome this drawback within given dimensions, the semi-reflecting plates inside the optical guide are multiplied. These semi-reflecting plates are all perfectly parallel to one another.

For some applications, notably requiring large visual fields, it is necessary to further enlarge the pupillar region in the two dimensions of space, in this case, as illustrated in FIG. 1 which shows a perspective view of a guide yielding such a pupil, the optical guide 10 is composed of two primary optical elements 20 and 30. The first element 20 is a first optical guide with plane and parallel faces comprising several first semi-reflecting plates 21 parallel to one another and allowing the pupil to be enlarged in a given first direction. The second element 30 is a second optical guide with plane and parallel faces comprising several second semi-reflecting plates 31 parallel to one another and allowing the pupil to be enlarged in a second direction perpendicular to the first direction. The two guides are joined together by a common face 22 and form a single plate with plane and parallel faces.

The path of the light rays coming from the imaging system up to the eye Y of the observer within such a guide 10 is represented by the zig-zag arrow 40, the light being reflected on the walls of the first guide 20 and of the second guide 30 and on the semi-reflecting plates 21 and 31.

In such a guide, the coefficients of reflection of the semi-reflecting plates 21 and 31 are necessarily low such that the light rays can pass through several semi-reflecting plates without excessive attenuation. As a consequence, the collimated image at the exit of the optical guide is necessarily very attenuated. In a certain number of applications and, in particular, for the field of aeronautics, the optical system can operate in a bright light environment and, in this case, the contrast of the image is low, which does not allow a good perception of the image. The luminance of the imaging system may be increased but other constraints appear such as the space occupied the lighting, its electrical power consumption, the problems of heat dissipation, etc.

SUMMARY OF THE INVENTION

The heads-up display system according to the invention does not have these drawbacks. If is based on the observation that the major part of the light energy transmitted by the optical guide is lost. The principle of the invention is to adapt the coefficient of the semi-reflecting plates which compose the optical guide in such a manner that the light is only transmitted at the locations where the eye of the observer is effectively located. The light efficiencies of the optical guide can thus be significantly increased. More precisely, the subject of the invention is a heads-up display system comprising at least one display and an optical guide comprising a first image guide comprising a plurality of first internal semi-reflecting plate, inclined with respect to a first plane, characterized in that the heads-up display system comprises:

an oculometer designed to detect the position of the ocular pupil of an observer;

at least one of the said first plates comprising a processing with programmable reflectivity, the said reflectivity depending on the position and/or the orientation of the ocular pupil detected by the oculometer, in such a manner as to reflect the image of the display towards the said pupil and only towards the latter.

Advantageously, the optical guide comprises a second image guide comprising a plurality of second internal semi-reflecting plates, inclined with respect to a second plane perpendicular to the first plane, at least one of the said second plates comprising a processing with programmable reflectivity, the said reflectivity depending on the position and/or the orientation of the ocular pupil detected by the oculometer, in such a manner as to reflect the image of the display towards the said pupil and only towards the latter.

Advantageously, the first semi-reflecting plates are plane and parallel to one another and/or the second semi-reflecting plates are plane and parallel to one another.

Advantageously, each optical guide has the external shape of a plate with plane and parallel faces.

Advantageously, in the absence of images transmitted by the imaging system, the reflectivity of the plates comprising a processing with programmable reflectivity depends on the luminance of the external scene.

Advantageously, the image supplied by the display depends on the information on position and/or orientation of the pupil supplied by the oculometer.

BRIEF DESCRIPTION OF THE DRAWINGS

The invention will be better understood and of other advantages will become apparent upon reading the description that follows presented by way of non-limiting example and by virtue of the appended figures amongst which.

DETAILED DESCRIPTION

Figure 1:
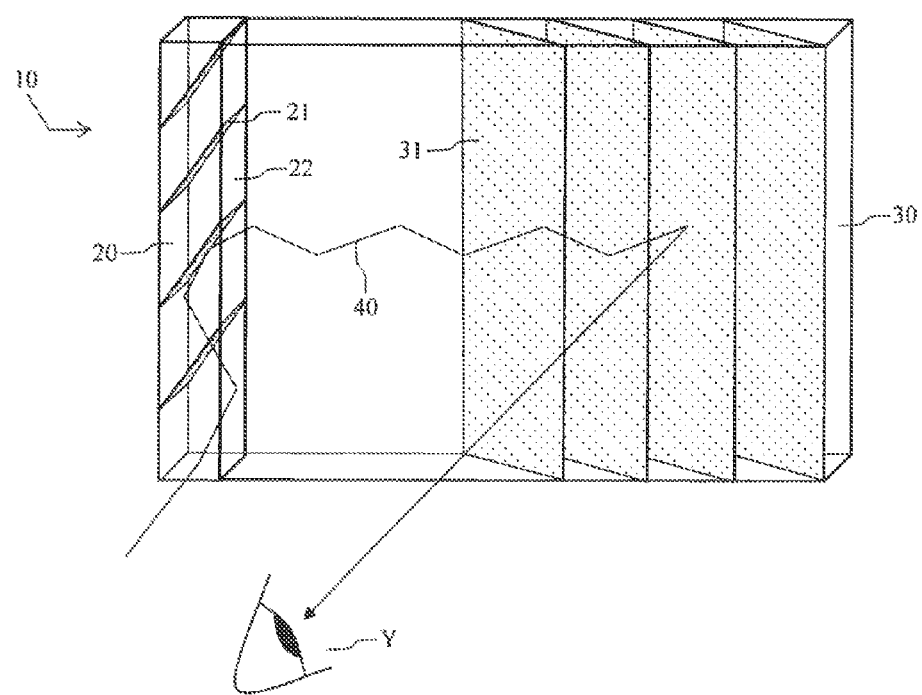
FIG. 1 shows an optical guide with semi-reflecting plates according to the prior art.
Figure 2:
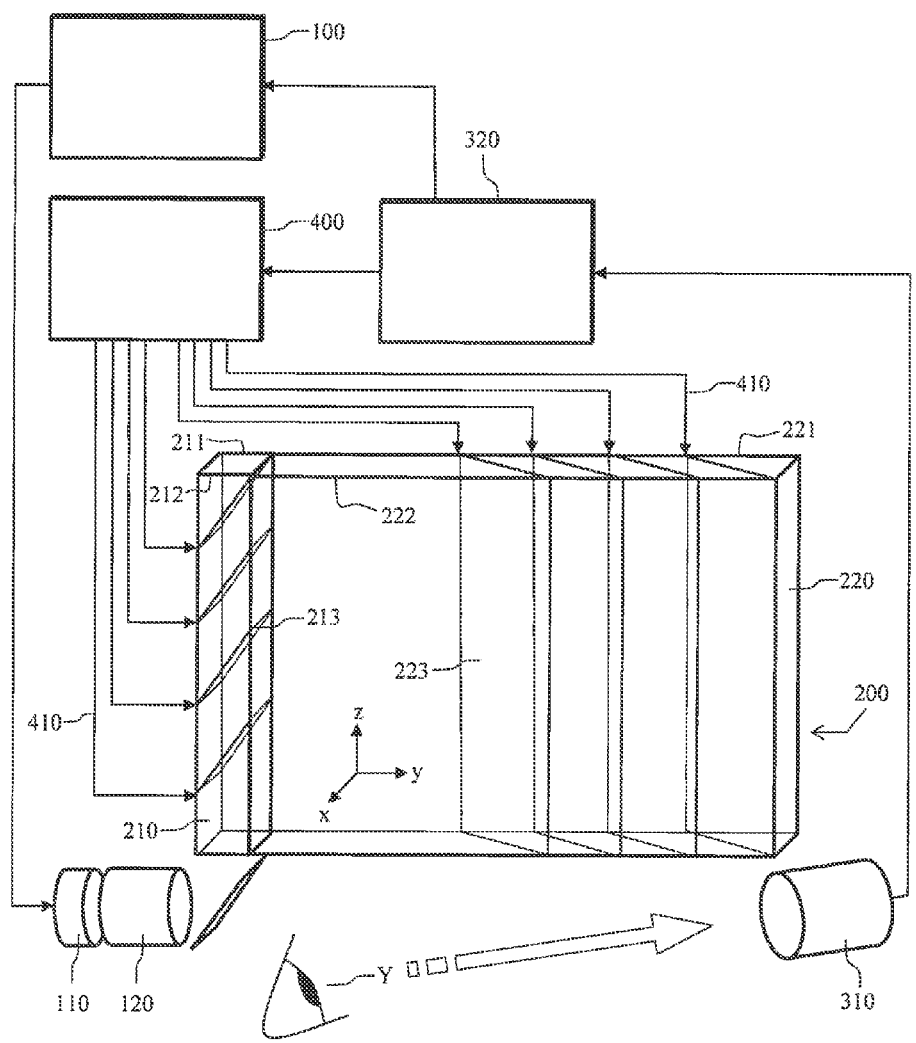
FIG. 2 shows the optical guide of a display system according to the invention.

By way of non-limiting example, an overview of a heads-up display system according to the invention is shown in FIG. 2. It essentially comprises:
- a generator of graphical images 100 connected to the avionics system in the case of aeronautical applications;
- a high-resolution micro-display 110 connected to the graphics generator. Typically, the dimensions of the image do not exceed a few millimeters;
- collimation optics 120 which form, from the image on the display, an image at infinity;
- an optical guide 200 according to the invention comprising a plurality of semi-reflecting plates with programmable reflectivity. The waveguide sends the collimated image towards the eye Y of the observer;
- an oculometric system comprising a camera 310 configured so as to capture the pupil of the eye Y of the observer and means 320 of analyzing the images of this pupil;
- electronic means 400 for controlling the reflectivity of the various semi-reflecting plates as a function of the data coming from the oculometric system.

The optical guide 290 according to the invention can take various form. In the case of FIG. 2, it comprises two image conductors 210 and 220. The first guide 210 widens the pupil in a first direction, the second guide 220 widens the pupil in the perpendicular direction. The two guides have a common face. Each guide has the external shape of a plate with plane and parallel faces. These various faces are referenced 211, 212, 221 and 222 in FIG. 2. Thus, the optical guide does not introduce any distortion of the outside scene when looking through it. Typically, the optical guide has a thickness of a few millimeters and a surface area of a few square centimeters.

Each guide comprises several internal semi-reflecting plates 213 and 223 being plane and parallel to one another, inclined with respect to a plane and equidistant. In the case of FIG. 2, the plane of the first guide is the plane (0, y, z) and the plane of the second guide is the plane (O, x, y).

The coefficient of reflection of each plate is controllable as indicated by the arrows 410 coming from the electronic means 400. There exist various techniques allowing this effect to be obtained. For example, for a film with a variable reflectivity, the coefficient of reflection of the film varies practically between 0% and 100% as a function of an applied voltage. The material used is a liquid crystal.

Oculometers operate according to the following principle. The pupil of the eye of an observer is illuminated by means of one or of several light sources generally emitting in the near infrared. A camera forms an image of this pupil on a sensor. The image coming from the sensor is analyzed by image analysis means so as to defect the position and the orientation of the pupil. The direction in which the observer is looking is thus determined.

There exist various possible configurations of the oculometer. The Patent application U.S. 2013/0207887 entitled "Heads-Up Displays including Eye Tracking" is one example of integration of the optical parts of an oculometer into a heads-up display system.

Knowing the position and the orientation of the pupil of the eye of an observer, the useful semi-reflecting plates are then determined which send the collimated image into this position and into this orientation. The electronic control means 400 adjust the reflectivity of the various semi-reflecting plates of the optical guide in such a manner that the plates useful for the transport of the image towards the eye are semi-reflecting, the other plates being transparent. The losses due to the reflections on the various plates which have no contribution to the vision of the image are thus reduced.

Figure 3:
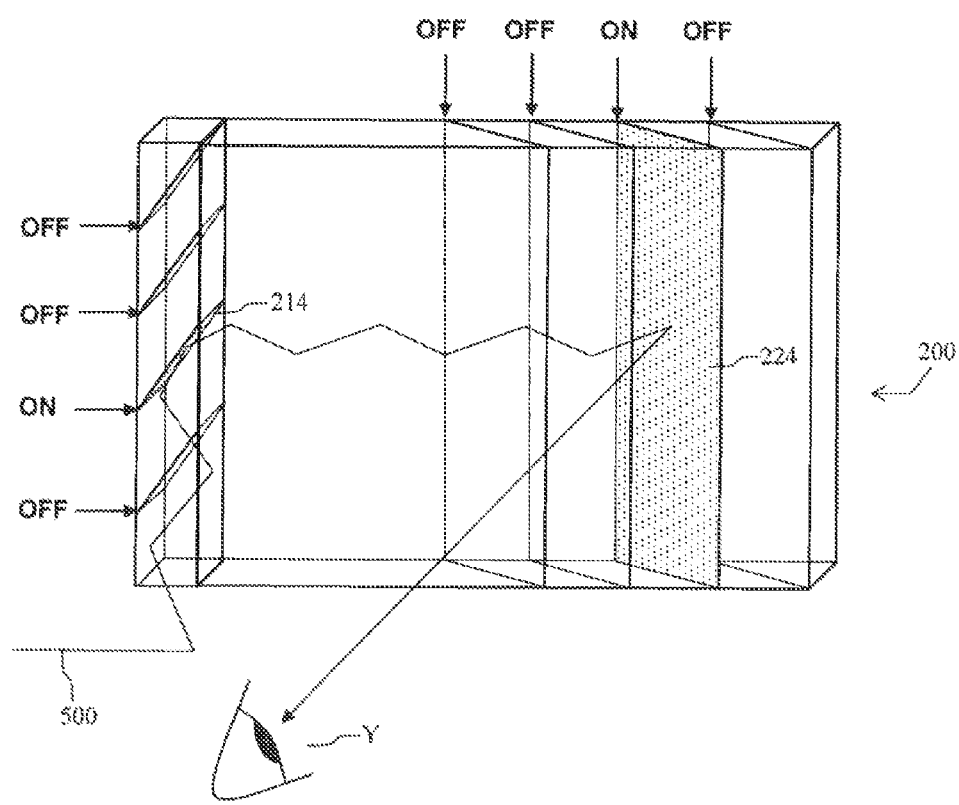
FIG. 3 shows the operation of an optical guide of a display system according to the invention.

The operation of the system is illustrated in FIG. 3. This figure only shows the optical guide 200 from the preceding figure. The path followed by the light rays coming from the display is symbolized by a broken arrow 500. By only rendering reflecting the useful semi-reflecting plates, which are shown with dotted surfaces in FIG. 3, it can be seen that the light ray is only reflected by two semi-reflecting plates 214 and 224, the other semi-reflecting plates being transparent. In FIG. 3, the control of the transparent plates provided by the electronic means 400 is symbolized by "OFF" and that of the semi-reflecting plates by "ON".

The control of the coefficient of reflection of the semi-reflecting plates can have applications other than the optimization of the luminance of the image coming from the display. Thus, when the display is not in operation and when the external luminance is low, the coefficients of reflection of the plates may all be close to zero so as to optimize the transmission of the external scene. In the same way, when the display is not in operation and when the external luminance is high, the coefficients of reflection of the plates may be high so as to attenuate the transmission of the external scene. Generally speaking, it is possible to optimize the contrast of the collimated image on the outside by adjusting the coefficients of reflection of the various semi-reflecting plates.

It is also possible to reduce the luminance of the display while at the same time conserving a good level of contrast of the projected images. The space occupied by the lighting, its electrical power consumption, the heat dissipation, etc. are thus reduced.

The oculometer gives the viewing position of the user, it is then possible to adapt the projected image according to this position. For example, for aeronautical applications, the image differs depending on whether the pilot is looking outside or, on the contrary, is looking at the instruments on his/her control panel.

What is claimed is:

1. A heads-up display system comprising:
   an oculometer designed to detect at least one of the position and orientation of the pupil of the eye of an observer; and
   an optical guide comprising a first image guide coupled to the oculometer, the first image guide comprising a plurality of first internal semi-reflecting plates inclined with respect to a first plane, wherein a reflectivity of at least one of the first internal semi-reflecting plates is controlled by an input signal from a controller used to program the reflectivity of at least one of the first internal semi-reflecting plates depending on at least one of the position and the orientation of the pupil of the eye detected by the oculometer, the reflectivity being the same over the entire semi-reflecting plate, and the other internal semi-reflecting plates being transparent in such a manner as to transmit an image of a display to at least one of the programmed internal semireflective plates in order to reflect the image of the display towards the pupil via a second image guide.

2. The heads-up display system according to claim 1, wherein the optical guide comprises the second image guide comprising a plurality of second internal semi-reflecting plates, inclined with respect to a second plane perpendicular to the first plane, wherein a reflectivity of at least one of the said second plates is controlled by an input signal from the controller used to program the reflectivity of at least one of the second internal semi-reflecting plates depending on at least one of the position and the orientation of the ocular pupil detected by the oculometer, in such a manner as to reflect the image of the display towards the said pupil.

3. The heads-up display system according to claim 1, wherein, the first internal semi-reflecting plates are plane and parallel to one another, the second internal semi-reflecting plates are plane and parallel to one another, or the first internal semi-reflecting plates are plane and parallel to one another and the second internal semi-reflecting plates are plane and parallel to one another.

4. The heads-up display system according to claim 3, wherein each of the first image guide and the second image guide has an external shape of a plate with plane and parallel faces.

5. The heads-up display system according to claim 1, wherein, in the absence of images transmitted by the imaging system, the reflectivity of the plates depends on the luminance of the external scene.

6. The heads-up display system according to claim 1, wherein the image supplied by the display depends on the information on the at least one of the position and the orientation of the pupil supplied by the oculometer.

7. The heads-up display system according to claim 2, wherein the second internal semi-reflecting plates are plane and parallel to one another.

8. The heads-up display system according to claim 7, wherein the second image guide has an external shape of a plate with plane and parallel faces.

\* \* \* \* \*